US009372913B2

(12) United States Patent
Hartlaub et al.

(10) Patent No.: US 9,372,913 B2
(45) Date of Patent: Jun. 21, 2016

(54) APPARATUS AND METHOD FOR HARMONIZING DATA ALONG INFERRED HIERARCHICAL DIMENSIONS

(71) Applicant: ClearStory Data Inc., Palo Alto, CA (US)

(72) Inventors: Jon Hartlaub, Mountain View, CA (US); Nick Rabinowitz, Oakland, CA (US); Vaibhav Nivargi, Mountain View, CA (US); Mikhail Bautin, Mountain View, CA (US); Douglas van der Molen, Elmhurst, IL (US)

(73) Assignee: ClearStory Data Inc., Palo Alto, CA (US)

(*) Notice: Subject to any disclaimer, the term of this patent is extended or adjusted under 35 U.S.C. 154(b) by 270 days.

(21) Appl. No.: 14/292,783

(22) Filed: May 30, 2014

(65) Prior Publication Data

US 2014/0358846 A1 Dec. 4, 2014

Related U.S. Application Data

(60) Provisional application No. 61/829,191, filed on May 30, 2013.

(51) Int. Cl.
*G06F 17/00* (2006.01)
*G06F 17/30* (2006.01)
*G06F 17/22* (2006.01)
*H04L 29/08* (2006.01)
*H04L 12/26* (2006.01)
*H04L 12/24* (2006.01)

(52) U.S. Cl.
CPC ...... *G06F 17/30592* (2013.01); *G06F 17/2235* (2013.01); *G06F 17/2247* (2013.01); *G06F 17/30091* (2013.01); *G06F 17/30286* (2013.01); *G06F 17/30342* (2013.01); *G06F 17/30908* (2013.01); *H04L 41/145* (2013.01); *H04L 43/00* (2013.01); *H04L 67/10* (2013.01)

(58) Field of Classification Search
None
See application file for complete search history.

(56) References Cited

U.S. PATENT DOCUMENTS

| 2003/0023593 | A1 | 1/2003 | Schmidt |
| 2003/0046121 | A1* | 3/2003 | Menninger ............ G06Q 10/06 705/7.29 |
| 2003/0163547 | A1 | 8/2003 | Beisty et al. |

(Continued)

OTHER PUBLICATIONS

International Search Report and Written Opinion issued to international patent application No. PCT/US2014/040334, Nov. 24, 2014, 11 pgs.

*Primary Examiner* — Hung Le
(74) *Attorney, Agent, or Firm* — Cooley LLP

(57) ABSTRACT

A server includes a data processing module with executable instructions executed by a processor to produce a first inferred data type from first received data and a second inferred data type from second received data. The first inferred data type is utilized to augment the first received data with computed values that aggregate the first received data along a first hierarchical dimension. The second inferred data type is utilized to augment the second received data with computed values that aggregate the second received data along a second hierarchical dimension. The first hierarchical dimension and the second hierarchical dimension are harmonized to a lowest common unit value. A first visualization of the first received data is provided based upon the lowest common unit value. A second visualization of the second received data is provided based upon the lowest common unit value.

18 Claims, 11 Drawing Sheets

(56) References Cited

U.S. PATENT DOCUMENTS

| | | |
|---|---|---|
| 2004/0024720 A1 | 2/2004 | Fairweather |
| 2006/0212286 A1 | 9/2006 | Pearson et al. |
| 2007/0011183 A1 | 1/2007 | Langseth et al. |
| 2007/0087756 A1* | 4/2007 | Hoffberg ............ G06Q 10/0631 455/450 |
| 2007/0226039 A1 | 9/2007 | Chu et al. |
| 2008/0162268 A1* | 7/2008 | Gilbert ............. G06Q 10/06375 705/7.29 |
| 2008/0189724 A1 | 8/2008 | Tien et al. |
| 2009/0006346 A1 | 1/2009 | C N et al. |
| 2009/0210441 A1 | 8/2009 | Mercer et al. |
| 2010/0036884 A1* | 2/2010 | Brown .................... G06Q 30/00 706/21 |
| 2010/0131457 A1* | 5/2010 | Heimendinger .. G06F 17/30592 707/602 |
| 2011/0246298 A1 | 10/2011 | Williams et al. |
| 2011/0264699 A1* | 10/2011 | Antonelli .......... G06F 17/30707 707/777 |
| 2011/0295860 A1 | 12/2011 | Dewar et al. |
| 2011/0295865 A1 | 12/2011 | Carroll et al. |
| 2012/0089562 A1 | 4/2012 | Deremigio et al. |
| 2012/0197852 A1 | 8/2012 | Dutta et al. |
| 2012/0197856 A1 | 8/2012 | Banka et al. |
| 2012/0284259 A1 | 11/2012 | Jehuda |
| 2013/0159511 A1 | 6/2013 | Backholm et al. |
| 2013/0238600 A1* | 9/2013 | Kindler ............. G06F 17/30958 707/722 |
| 2014/0164071 A1 | 6/2014 | English et al. |
| 2014/0266012 A1 | 9/2014 | Flynn |
| 2014/0372953 A1 | 12/2014 | Laurance |

\* cited by examiner

APPARATUS AND METHOD FOR HARMONIZING DATA ALONG INFERRED HIERARCHICAL DIMENSIONS

CROSS-REFERENCE TO RELATED APPLICATION

This application claims priority to U.S. Provisional Patent Application Ser. No. 61/829,191, filed May 30, 2013, the contents of which are incorporated herein.

This application is related to commonly owned and concurrently filed U.S. Ser. No. 14/292,765, filed May 30, 2014, U.S. Ser. No. 14/292,775, filed May 30, 2014 and U.S. Ser. No. 14/292,788, filed May 30, 2014.

FIELD OF THE INVENTION

This invention relates generally to data analyses in computer networks. More particularly, this invention relates to collaborative analyses of data from disparate sources.

BACKGROUND OF THE INVENTION

Existing data analysis techniques typically entail discrete analyses of discrete data sources. That is, an individual typically analyzes a single data source in an effort to derive useful information. Individual data sources continue to proliferate. Public data includes such things as census data, financial data and weather data. There are also premium data sources, such as market intelligence data, social data, rating data, user data and advertising data. Other sources of data are private, such as transactional data, click stream data, and log files.

There is a need for a scalable approach to analyses of multiple sources of data. Ideally, such an approach would support collaboration between end users.

SUMMARY OF THE INVENTION

A server includes a data processing module with executable instructions executed by a processor to produce a first inferred data type from first received data and a second inferred data type from second received data. The first inferred data type is utilized to augment the first received data with computed values that aggregate the first received data along a first hierarchical dimension. The second inferred data type is utilized to augment the second received data with computed values that aggregate the second received data along a second hierarchical dimension. The first hierarchical dimension and the second hierarchical dimension are harmonized to a lowest common unit value. A first visualization of the first received data is provided based upon the lowest common unit value. A second visualization of the second received data is provided based upon the lowest common unit value.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
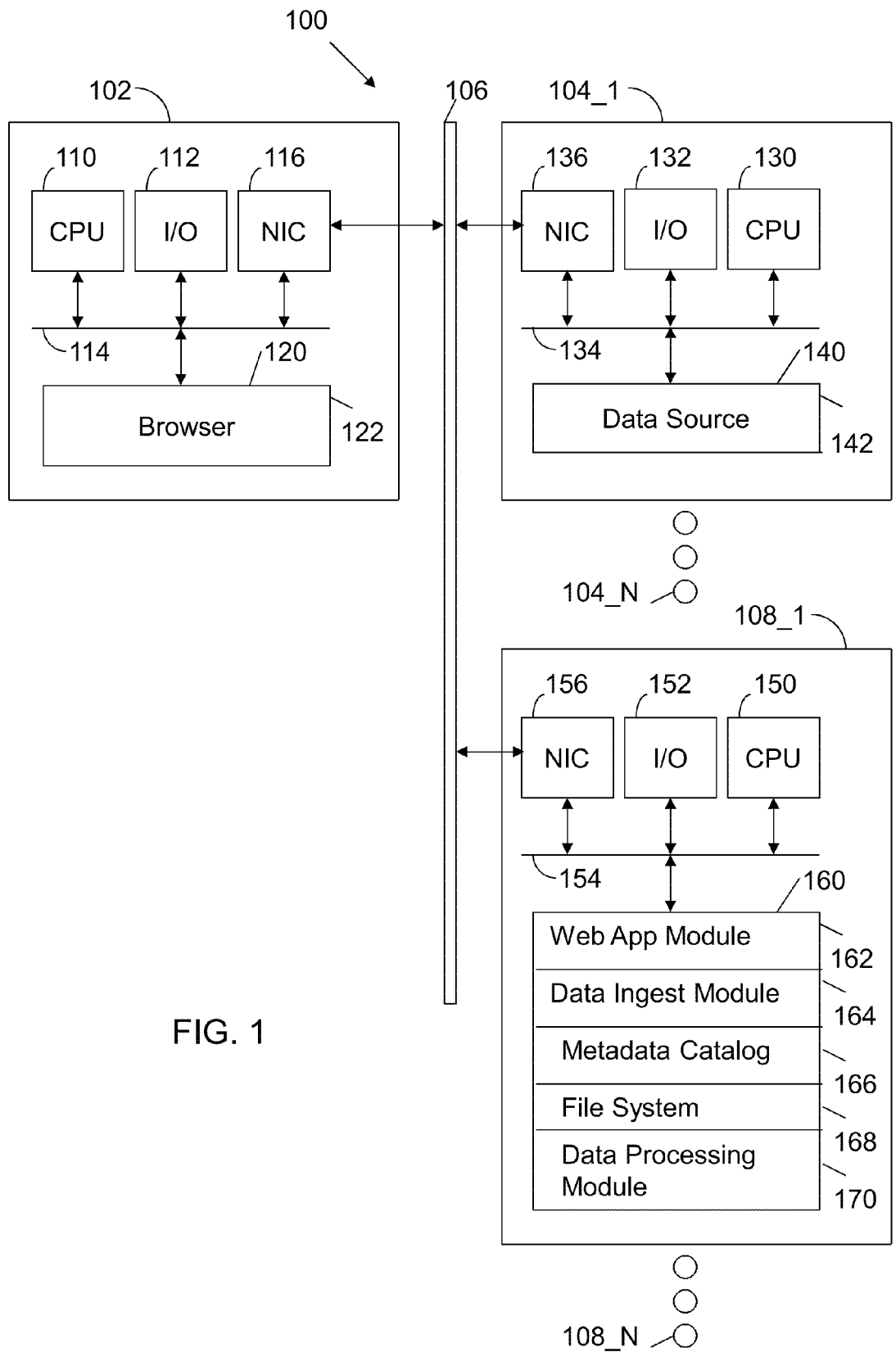
FIG. 1 illustrates a system configured in accordance with an embodiment of the invention.

FIG. 1 illustrates a system 100 configured in accordance with an embodiment of the invention. The system 100 includes a client computer 102 connected to a set of servers 104_1 through 104_N via a network 106, which may be any wired or wireless network. The servers 104_1 through 104_N are operative as data sources. The figure also illustrates a cluster of servers 108_1 through 108_N connected to network 106. The cluster of servers is configured to implement operations of the invention.

The client computer 102 includes standard components, such as a central processing unit 110 and input/output devices 112 connected via a bus 114. The input/output devices 112 may include a keyboard, mouse, touch display and the like. A network interface circuit 116 is also connected to the bus 114 to provide an interface with network 106. A memory 120 is also connected to the bus 114. The memory 120 stores a browser 122. Thus, a client machine 102, which may be a personal computer, tablet or Smartphone, accesses network 106 to obtain information supplied in accordance with an embodiment of the invention.

Servers 104_1 through 104_N also include standard components, such as a central processing unit 130 and input/output devices 132 connected via a bus 134. A network interface circuit 132 is also connected to the bus 134 to provide connectivity to network 106. A memory 140 is also connected to the bus 134. The memory 140 stores a data source 142. Different servers 104 supply different data sources. For example, some servers may supply public data, such as census data, financial data and weather data. Other servers may provide premium data, such as market intelligence data, social data, rating data, user data and advertising data. Other servers may provide private data, such as transactional data, click stream data, and log files. The data may be in any form. In one form, the data is structured, such as data from a relational database. In another form the data is semi-structured, such as document-oriented database. In another form the data is unstructured. In still another form the data is streamed. A data stream is a sequence of data elements and associated real time indicators.

Each server 108 has standard components, such as a central processing unit 150 connected to input/output devices 152 via a bus 154. A network interface circuit 156 is also connected to the bus 154 to provide access to network 106. A memory 160 is also connected to the bus 154. The memory 160 stores modules and data to implement operations of the invention. In one embodiment, a web application module 162 is used to provide a relatively thin front end to the system. The web application module 162 operates as an interface between a browser 122 on a client machine 102 and the various modules in the software stack used to implement the invention. The web application module 162 uses application program interfaces (APIs) to communicate with the various modules in the software stack.

The memory 160 also stores a data ingest module 164. The data ingest module 164 consumes data from various data sources and discovers attributes of the data. The data ingest module 164 produces metadata characterizing ingested content, which is stored in a metadata catalog 166. The ingested data is loaded into a file system 168, as discussed below. A data processing module 170 includes executable instructions to support data queries and the ongoing push of information to a client device 102, as discussed below. The modules in memory 160 are exemplary. The different modules may be on each server in the cluster or individual modules may be on different servers in the cluster.

Figure 2:
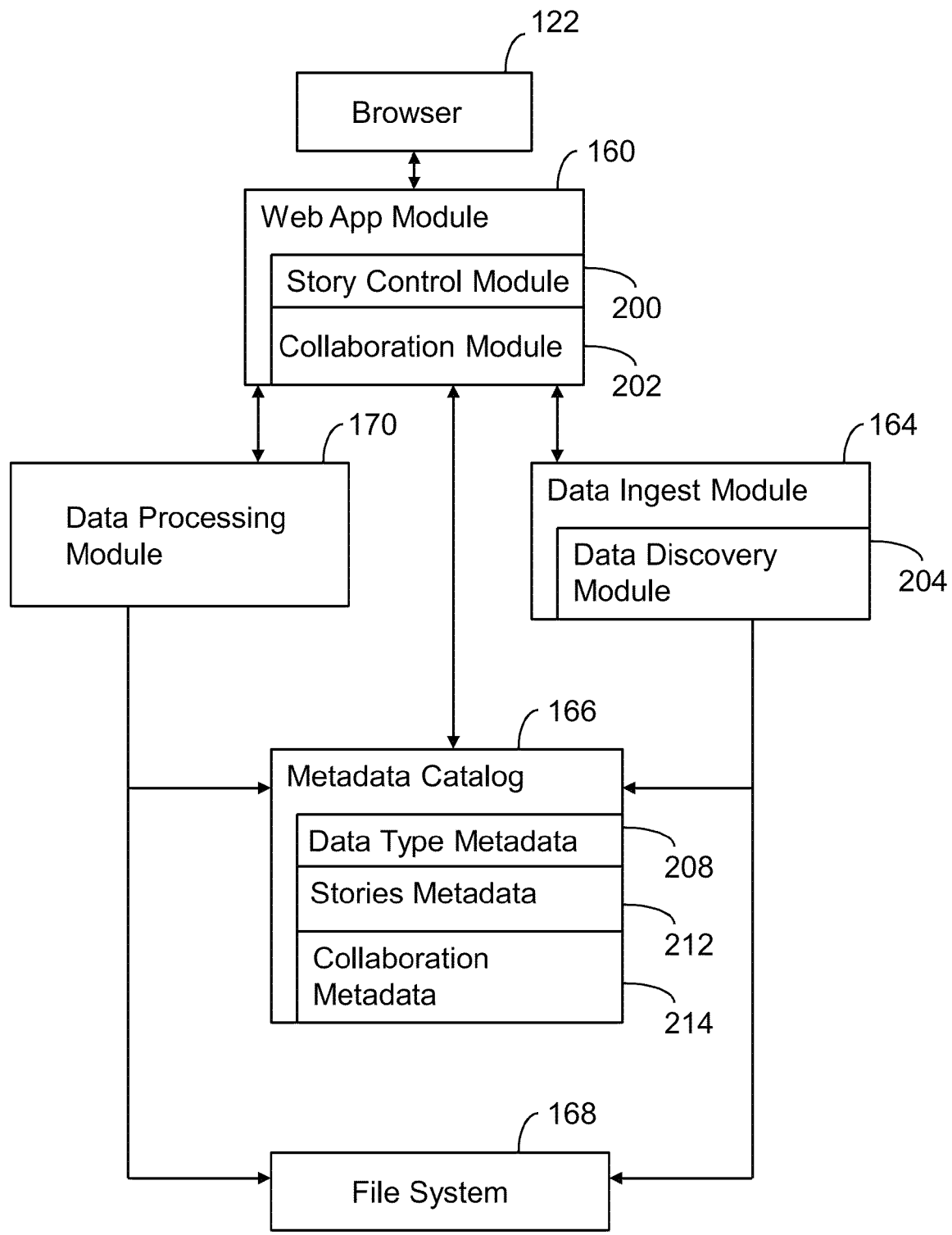
FIG. 2 illustrates component interactions utilized in accordance with an embodiment of the invention.

FIG. 2 is a more particular characterization of various modules shown in FIG. 1. The arrows in the figure illustrate interactions between the modules, which are achieved through APIs. At the top of the figure is a browser 122, which is resident on a client device 102. The remaining modules in the figure are implemented on a cluster of servers 108.

The web application module 160 may include a story control module 200. As used herein, the term story references an ongoing evaluation of data, typically from disparate sources. The data is pushed to a client device as data is updated. Thus, a data story is a living analysis of one or more data sets, which may be either internal or external data sources. A data story can be automatically refreshed on a set cycle to keep the analysis up-to-date as data from the source gets updated or refreshed.

The story control module 200 includes executable instructions to provide data visualizations that are data-aware. The data-awareness is used to appropriately scale data visualizations and harmonize data from discrete sources, as demonstrated below.

The web application module 160 may also include a collaboration module 202, which includes executable instructions to support collaboration between end users evaluating a common story. The collaboration module supports context-aware data analysis collaboration, such as data-aware visualization transitions, data-aware data annotations and context-aware data annotations, as demonstrated below.

FIG. 2 also illustrates a data ingest module 164, which includes a data discovery module 204. The data discovery module 204 includes executable instructions to evaluate attributes of ingested data. The data discovery module 204 communicates the attributes of the ingested data as data type metadata 208, which is stored in the metadata catalog 166.

In one embodiment, the data discovery module 204 operates in conjunction with a distributed, fault-tolerant real-time computation platform, such as the Storm open source software project. In one embodiment, the computation platform has a master node and worker nodes. The master node operates as a coordinator and job tracker. The master node assigns tasks to worker nodes and monitors for failures. Each worker node includes a supervisor method that listens for work assigned to it. Each worker node executes a subset of a topology. A running topology contains many worker processes spread across many machines.

A topology is a graph of a computation. Each node in a topology includes processing logic. Links between nodes indicate how data is passed between nodes. The computation platform may operate on a stream. A stream is an unbounded sequence of tuples. A tuple is an ordered list of elements. A field in a tuple can be an object of any type.

The computation platform provides the primitives for transforming a stream into a new stream in a distributed and reliable way. For example, one may transform a stream of tweets into a stream of trending topics. Stream transformations may be accomplished using spouts and bolts. Spouts and bolts have interfaces that one implements to run application-specific logic.

A spout is a source of streams. For example, a spout may read tuples and emit them as a stream. Alternately, a spout may connect to the Twitter API and emit a stream of tweets.

A bolt consumes any number of input streams, performs some processing and possibly emits new streams. Complex stream transformations require multiple steps and therefore multiple bolts. Edges in the graph indicate which bolts are subscribing to which streams. When a spout or bolt emits a tuple to a stream, it sends the tuple to every bolt that subscribed to that stream.

Links between nodes in a topology indicate how tuples should be passed. For example, if there is a link between Spout A and Bolt B, a link from Spout A to Bolt C, and a link from Bolt B to Bolt C, then every time Spout A emits a tuple, it will send the tuple to both Bolt B and Bolt C. All of Bolt B's output tuples will go to Bolt C as well.

Data type metadata 208 from the data ingest module 164 is loaded into a file system 168. In one embodiment, the file system 168 is a Hadoop Distributed File System (HDFS). Hadoop is an open-source software framework that supports data-intensive distributed applications. Alternately, the metadata may be stored in a separate catalog storage repository. Advantageously, HDFS supports the running of applications on large clusters of commodity hardware.

Returning to the metadata catalog 166, stories metadata 212 is maintained to support the story control module 200 of the web application module. The stories metadata 212 characterizes the type of data to be supplied in a story. The stories metadata 212 also includes state information to track changes in the story over time. Thus, the stories metadata 212 provides contextual information to reconstruct the development of a story over time.

The metadata catalog 166 also includes collaboration metadata 214. The collaboration metadata 214 supports operations performed by the collaboration module 202. The collaboration metadata 214 characterizes groups of individuals that may share a story. The collaboration metadata 214 may include various permissions that specify which individuals can see which data. For example, some collaborating individuals may have access to granular data, while others may only have access to aggregate data. The collaboration metadata 214 also maintains state information tracking collaboration over time. Consequently, the collaboration metadata 214 provides contextual information to reconstruct collaborative actions over time.

The collaboration metadata 214 may be used in connection with data and analytic data stories, concepts that will be discussed in detail below. Different permissions can be set for data versus stories. For example, some collaborating individuals may have the permission to add data to the system and manage the data. Some individuals may have access to granular data and others have access to aggregate data. For analytic data stories, collaborators may have permission to iterate a story, view it only or view and comment on it. All permissions on data and stories are maintained as state information tracked over time. Collaboration metadata permissions may specify what operations may be performed on data or the view of data. For example, in one embodiment, a read only collaborator may only comment on and view data.

In one embodiment, the data processing module 170 supports distributed in-memory processing of data. As discussed below, the data processing module 170 operates on data units utilized in accordance with an embodiment of the invention.

The data processing module 170 may utilize an open source cluster computing system, such as Spark from the University of California, Berkeley AMPLab. The core concept in Spark is a Resilient Distributed Dataset (RDD). An RDD is a data structure for a sequence of data that is fault tolerant and supports many parallel data manipulation operations, while allowing users to control in-memory caching and data placement.

RDDs explicitly remember the derivation trees for the data sets in memory so that they can be re-derived in case of a fault. RDDs also allow explicit caching so that important intermediate results can be held in memory, which accelerates later computations that require intermediate results or if that same result needs to be sent to a client again. The data processing module 170 is further discussed below. Attention initially focuses on data ingestion.

Figure 3:
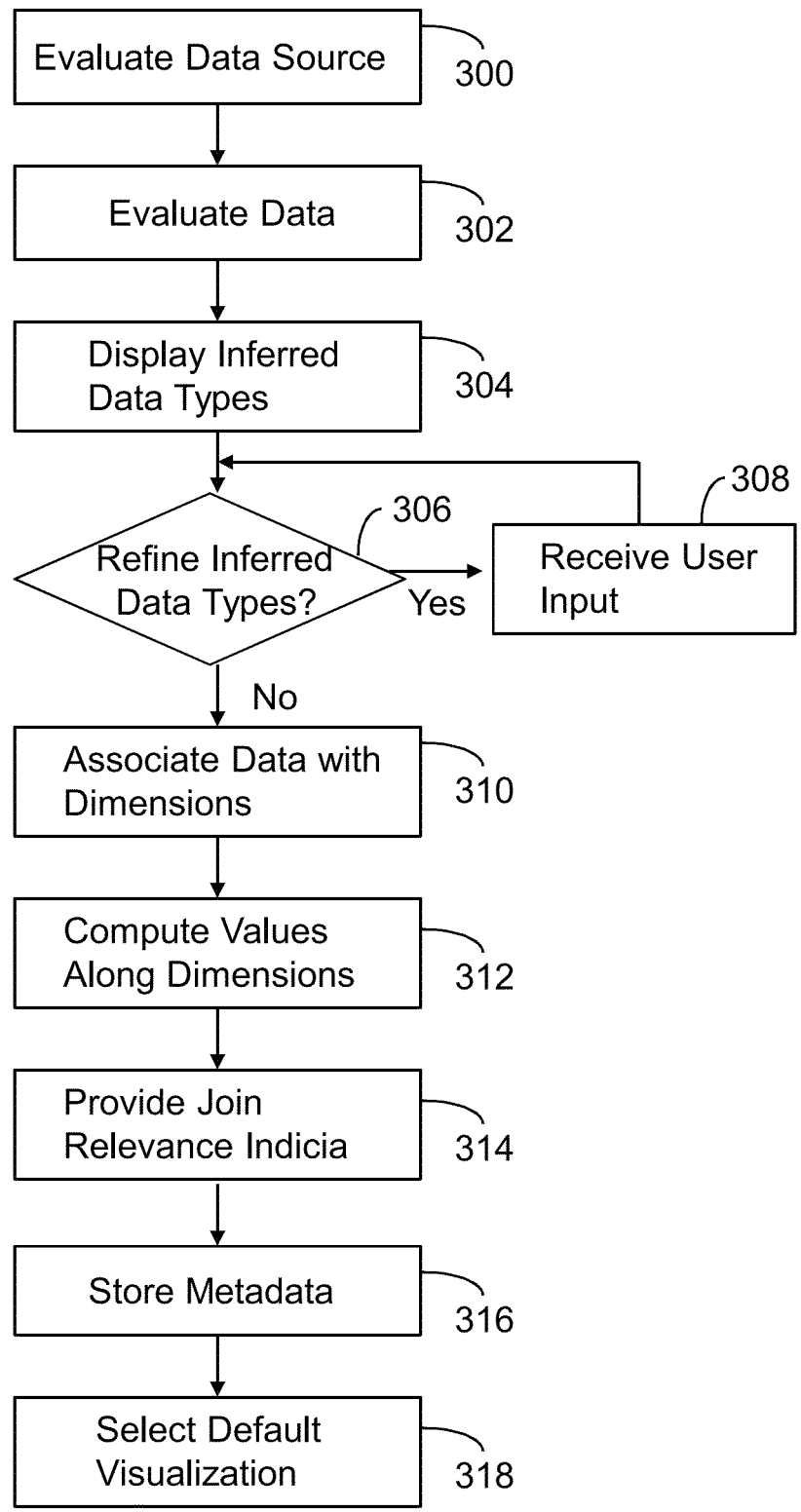
FIG. 3 illustrates processing operations associated with the data ingest module.

FIG. 3 illustrates processing operations associated with the data ingest module 164. Initially, the data ingest module 164 evaluates a data source 300. Based upon the data source, the module infers data types, data shape and/or data scale. The data types may be time data, geographical data, dollar amounts, streamed data, and the like. The data shape may be characterized in any number of ways, such as a continuous stream of uniform data, a continuous stream of bursty data, sparse data from a data repository, aggregated sections of data from a source, and the like. The data scale provides an indication of the volume of data being ingested from a data source. The data ingest module 164 processes all types of data, whether structured data (e.g., a relational database), semi-structured data (e.g., a document-oriented database) or unstructured data.

Next, the data is evaluated 302. That is, the actual data is processed to infer data types, data shape and/or data scale. In the case of data types, the identification of a zip code or geo-spatial coordinates implicates a geography data type. Alternately, certain number formats implicate a time data type. A currency indicator may implicate a sales data type. Categories are also supported as a data type. Categories may be any data which does not conform to time, geography or numeric types. For example, in the case of hotels, the categories may be business, resort, extended stay or bed and breakfast. Categories may be hierarchical, such as a reading material category with a hierarchy of electronic books, audible books, magazines and newspapers. The system detects category types and suggests them to the user. The system allows one to filter by a specific category value or break down a numeric measure by available category values (e.g., view Hotel Revenue split by different hotel categories). In the case of data shape, evaluation of the data may lend itself to characterizations of the shape of the data. In the case of the data scale, evaluation of the data provides an indication of the volume of data.

Figure 4:
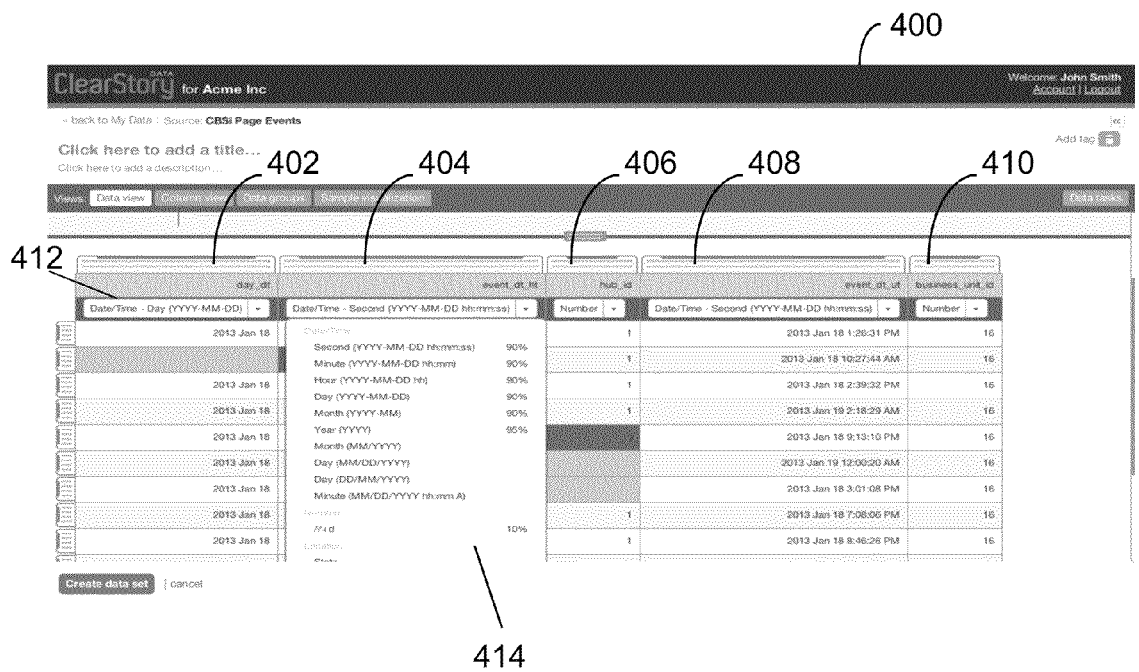
FIG. 4 illustrates a user interface for displaying inferred data types.

These evaluations result in inferred data types, which may be displayed to a user 304. FIG. 4 provides an example of such a display. In particular, FIG. 4 illustrates an interface 400 displaying an ingested csv file with five columns 402, 404, 406, 408 and 410. The first column 402 shows data in a Year/Month/Date format, which is indicated in data identification filed 412. The second column 404 has the same format. A user may access a window 414 showing the confidence of the characterization. The third column 406 is characterized as a number data type. The fourth column 408 has a Year/Month/Data format, while the fifth column 410 has an identified number data type. Thus, the system provides for user reinforcement, validation and correction of inferred data types.

Returning to FIG. 3, if a user wants to refine an inferred data she may do so (306—Yes). Input is then received from the user 308. For example, the window 414 of FIG. 4 may be used to receive user input that refines the data characterization. After data refinement or if data refinement is no longer required, the data is associated with one or more dimensions 310. A dimension is a hierarchical characterization of data. For example, in the case of a time dimension or a number dimension the hierarchy is increasing values. In the case of a geographical dimension the hierarchy is expanding geographical size (e.g., address to zip code to county to state to country).

Next, values are computed along dimensions 312. For example, consider the case of ingested data with a list of days. The days are aggregated into months, which are aggregated into individual years, which are aggregated into multiple years. This roll up of values is computed automatically. Thus, while an original data set may include data from individual days, the ingested data maintains the data from the individual days, but is also supplemented to include dimensional data of months, individual years and multiple years. Similarly, in the case of geography, if an original data set includes individual zip codes, those individual zip codes are augmented to include dimensional data for county, state and country, or any other default or specified hierarchy. Observe that this is performed automatically without any user input. Thus, the original data is pre-processed to include dimensional data to facilitate subsequent analyses. The original data may also be pre-processed to generate other types of metadata, such as the number of distinct values, a minimum value and maximum value and the like. This information may inform the selection of visualizations and filtering operations. This information may also be used to provide join relevance indicia 314.

Figure 5:
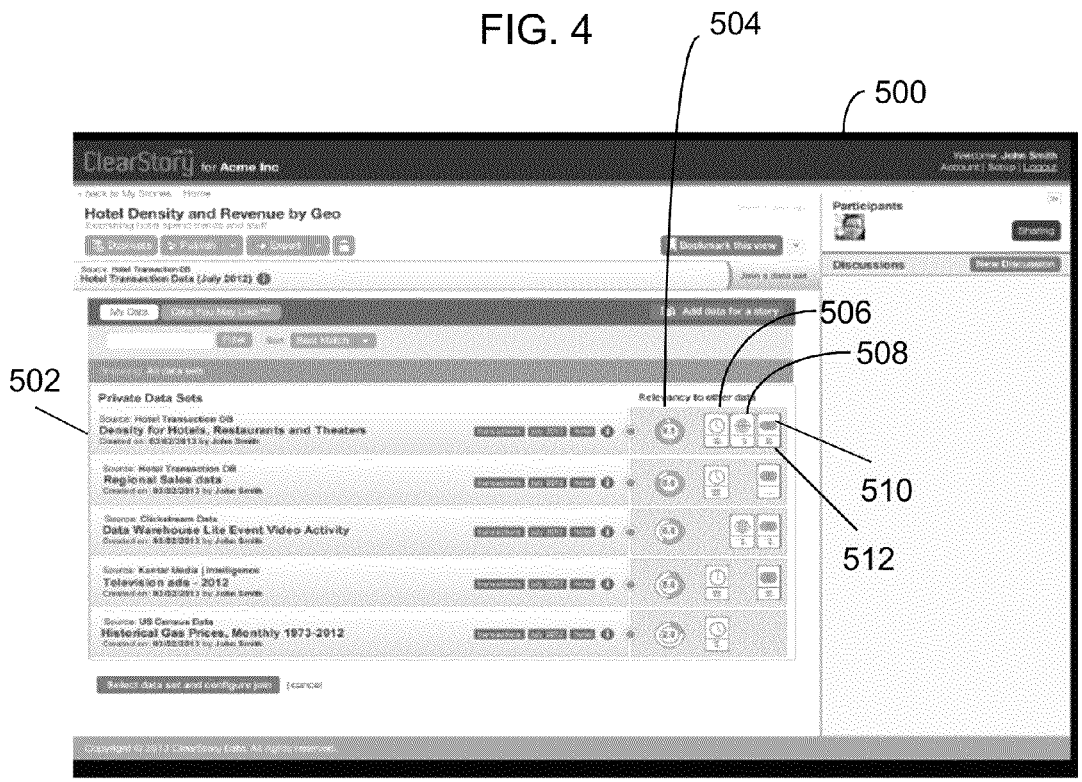
FIG. 5 illustrates a user interface to display join relevance indicia utilized in accordance with an embodiment of the invention.

FIG. 5 illustrates an interface 500 to provide join relevance indicia. In particular, the figure provides a textual description of a data set 502. Further, the interface provides indicia 504 of the relevance of the data to other data. In this case, the indicia include numeric indicia (9.5 on a scale of 10.0) and graphical indicia in the form of a 95% completed wheel. The indicia 504 may be accompanied by characterizations of the components of the data set. In this case, there is a chronological data type component 506, a geographical data type component 508 and an "other" data type component 510. Each data type component may include indicia 512 of confidence of the data type characterization. In one embodiment, the score is a function of the percentage of columns in the two data sets that can be merged. User input may be collected to revise or otherwise inform the join relevance indicia. In this way, the system involves the user in reinforcement, validation and correction of join recommendations.

Returning to FIG. 3, the next operation is to store metadata 316. For example, data type metadata 208 may be stored in the metadata catalog 166 shown in FIG. 2. The final operation of FIG. 3 is to select a default visualization 318. That is, relying upon one or more of the data type, data shape and data scale, the data ingest module 164 may establish a default visualization (e.g., map, bar chart, pie chart, etc.).

Thus, an embodiment of the invention provides for data ingestion from disparate data sources and data inferences about the ingested data. Inferred data types are derived from structured, semi-structured and/or unstructured data sources. The data source may be internal private data or an external data source. The invention supports ingestion through any delivery mechanism. That is, the source can provide one-time data ingestion, periodic data ingestion at a specified time interval or a continuous data ingestion of streamed content.

The data ingestion process also provides for data harmonization by leveraging identified data types. That is, the identified data types are used to automatically build an ontology of the data. For example, in the case of a recognized zip code, the harmonization process creates a hierarchy from zip code to city to county to state to country. Thus, all data associated with the zip code is automatically rolled up to a city aggregate value, a county aggregate value, a state aggregate value and a country aggregate value. This automated roll-up process supports subsequent drill-down operations from a high hierarchical value to a low hierarchical value (e.g., from state to city). This information is then used to generate the most appropriate visualization for the data. This data harmonization also accelerates the convergence of two or more data sets.

Figure 6:
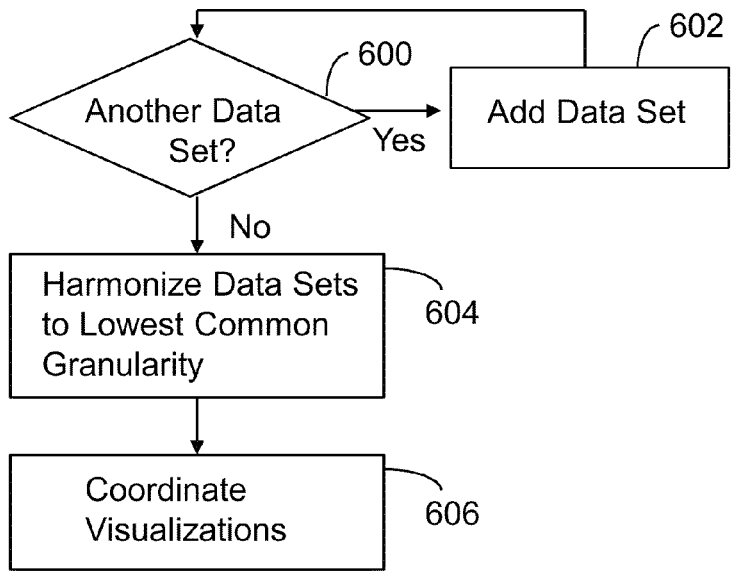
FIG. 6 illustrates data merge operations performed in accordance with an embodiment of the invention.

The convergence of two or more data sets may be implemented through the data processing module 170 and the story control module 200 of the web application module 160. FIG. 6 illustrates processing operations associated with the convergence of two or more data sets. A user has an opportunity to select a data set 600. If a dataset is selected (600—Yes), a data set is added 602. After all data sets have been selected, the data sets are harmonized to the lowest common data unit granularity 604. That is, when two or more data sets are converged, the common dimensions across the data sets are harmonized so that the converged data sets get rendered into visualizations that are common elements between the data sets. For instance, if a first data set is at a zip code level and a second data set is at a county level, when the first data set is combined with the second data set, the combination is automatically harmonized to the lowest level of common granularity. In this example, county is the lowest common granularity across the data sets. This harmonization accelerates the process of converging multiple data sets during multi-source analyses. The final operation of FIG. 6 is to coordinate visualizations 606. The visualization may be based upon the granularity of the data set (data scale), the data shape and/or the data type. The system selects a default visualization, which may be overridden by a user. Examples of the foregoing operations are provided below.

Figure 7:
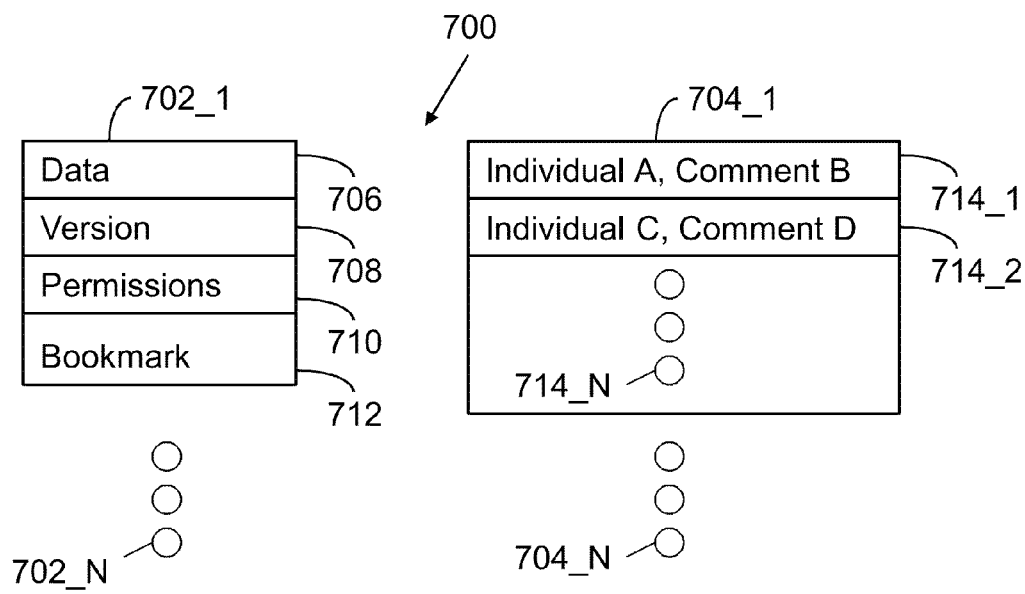
FIG. 7 illustrates in-memory data units and corresponding discussion threads utilized in accordance with an embodiment of the invention.

The data processing module 170 is an in-memory iterative analytic data processing engine that operates on "data units" associated with a story. FIG. 7 illustrates a story 700 comprising a set of data units 702_1 through 702_N. Each data unit has a corresponding discussion thread 704_1 through 704_N. In one embodiment, a data unit 702 includes data 706. The data 706 includes raw ingested data plus rolled-up hierarchical data, as previously discussed. A data unit also includes a version field 708. The version field may use a temporal identifier to specify a version of data, for example, after it has been filtered during some analytic process. A permissions field 710 specifies permissions to access the data. Different individuals collaborating in connection with a story may have different access levels to the data. For example, one individual may have access to all data, while another individual may only have access to aggregated data. A bookmark field 712 may be used to persist a data unit, as discussed below.

Each discussion thread 704 includes a set of discussion entries 714_1 through 714_N. Permissions field 710 may establish individuals that may participate in a discussion thread. Example discussion threads are provided below.

Thus, FIG. 7 illustrates the in-memory manifestation of a discussion thread and its association with an in-memory data unit 702. Data operators (e.g., sum, average, standard deviation) may be used to perform iterative operations on data units. Each data unit may also store filter information, a best fit data visualization setting, and data visualization highlight information.

Figure 8:
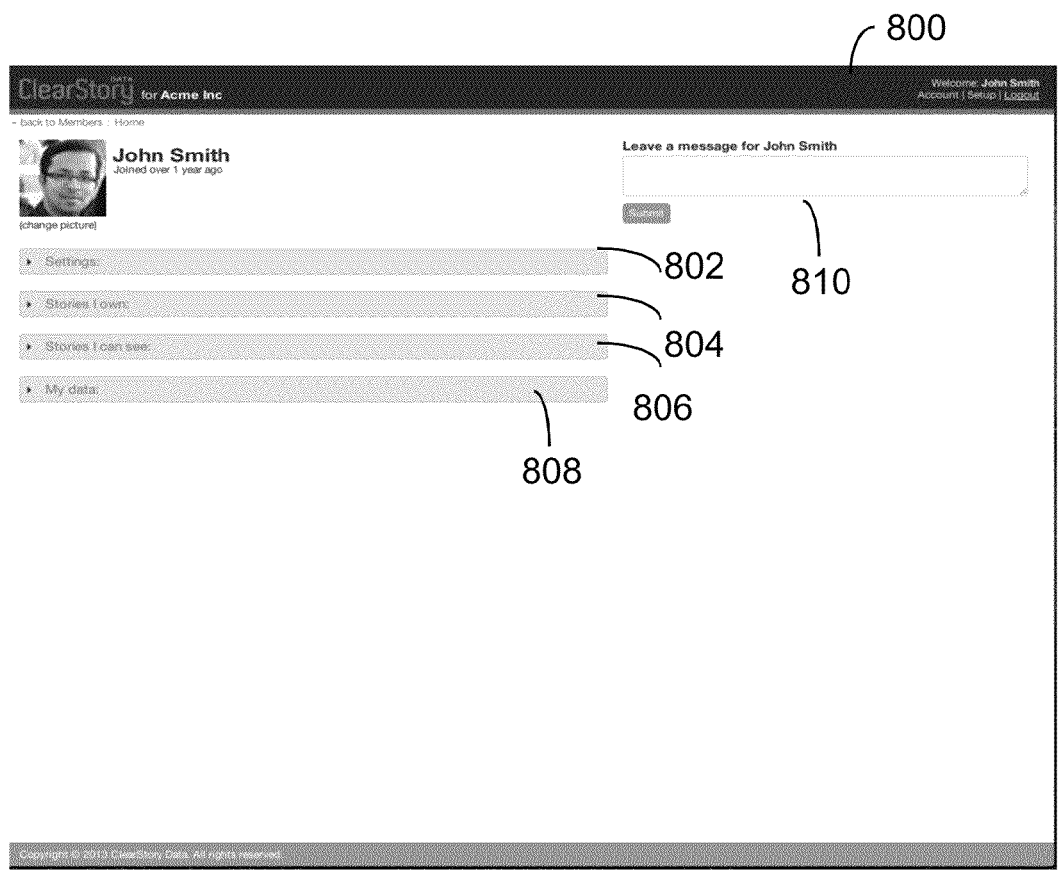
FIG. 8 illustrates an initial graphical user interface that may be used in accordance with an embodiment of the invention.

The operations of the invention are more fully appreciated with reference to a use scenario. FIG. 8 illustrates a home page 800 that may be displayed on a browser 122 of a client device 102. The home page 800 may be supplied by the web application module 160. In this example, the home page 800 includes a settings field 802. The home page 800 also includes a field 804 to list stories owned by the user. These are stories constructed by or on behalf of the user. Typically, such stories are fully controlled by the user.

The home page 800 may also include a field 806 for stories that may be viewed by the user. The user may have limited permissions with respect to viewing certain data associated with such stories. In one embodiment, the permissions field 710 of each data unit 702 specifies permissions.

The home page 800 also has field 808 for supplying data owned by a user. The data owned by a user is effectively the data units 702 owned by a user. Finally, the home page 800 includes a collaboration field 810 to facilitate online communication with other users of the system. The discussion threads 704 populate the collaboration field 810.

Thus, all users have settings, data and stories. Access to stories and collaboration permissions may be controlled by the stories metadata 212 and collaboration metadata 214 of the metadata catalog 166 operating in conjunction with the data units. More particularly, the web application module 160 utilizes the story control module 200 to access stories metadata 212 and the collaboration module 202 to access collaboration metadata 214. The web application module 160 may pass information to the data processing module 170, which loads information into data units 702 and discussion threads 704.

Figure 9:
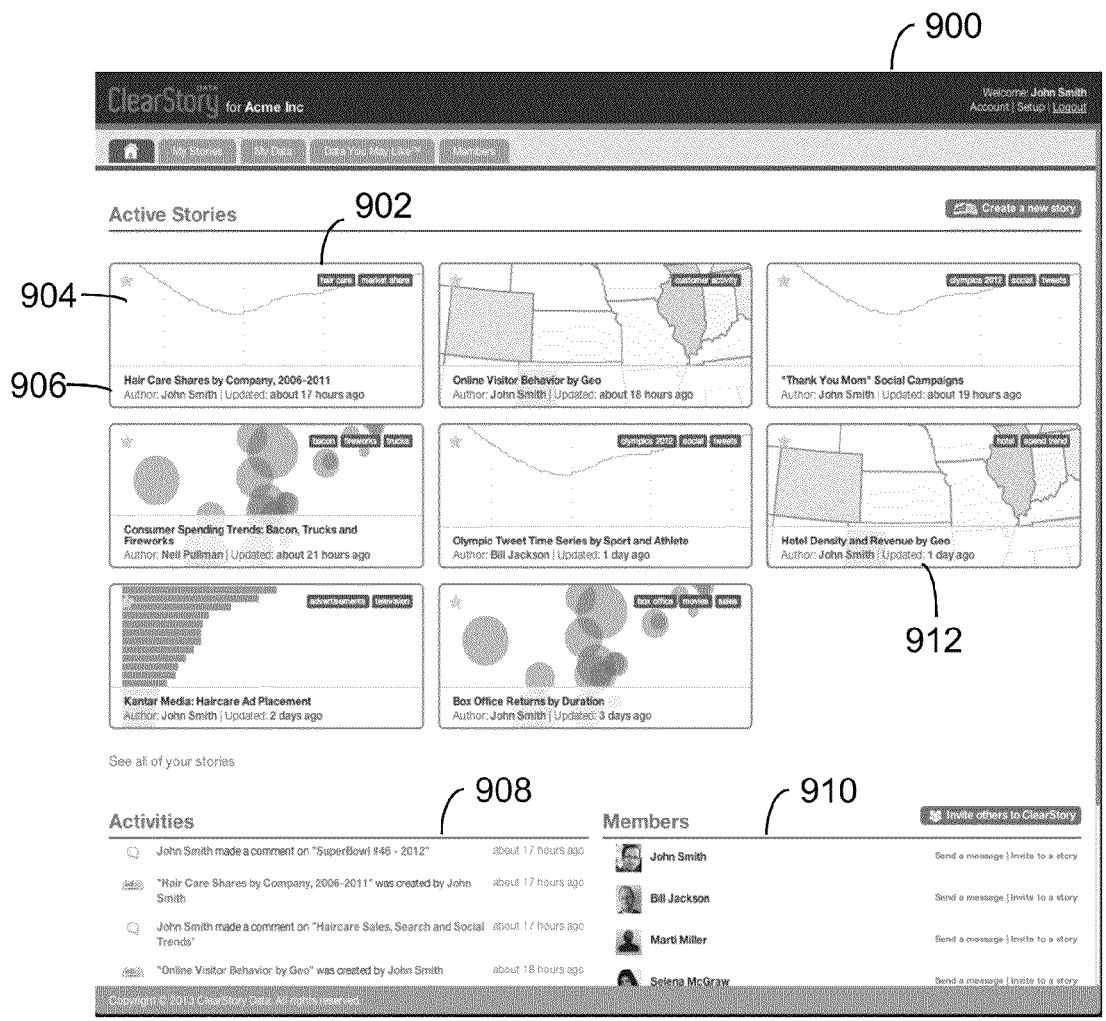
FIG. 9 illustrates various data streams that may be evaluated by a user in accordance with an embodiment of the invention.

If a user activates the link 804 for her stories, an interface, such as that shown in FIG. 9 may be supplied. FIG. 9 illustrates an interface 900 depicting individual stories 902. Each story 902 may have an associated visualization 904 and text description 906. The interface 900 may also display a text description of recent activities 908 by the user. Collaborative members 910 may also be listed. If the user selects story 912, the interface of FIG. 10 is provided.

Figure 10:
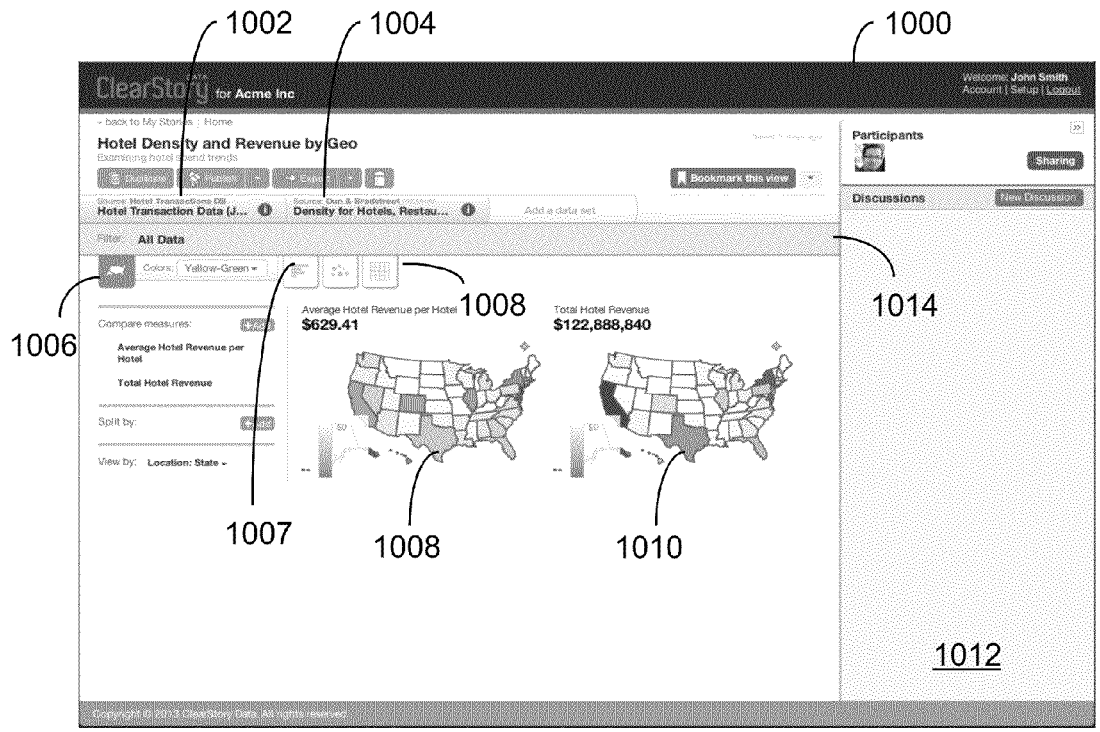
FIG. 10 illustrates data-aware convergence and visualization of disparate data sources.

FIG. 10 illustrates an interface 1000 for the story entitled "Hotel Density and Revenue by Geography". The interface 1000 indicates a first data source 1002 from a hotel transaction database and a second data source 1004 from a Dun & Bradstreet report on hotel density. In this example, the hotel transaction database has information organized as a function of time, while the hotel density information is organized by geography. The invention provides a data-aware convergence of these two data sets. More particularly, FIG. 10 illustrates data-aware convergence and visualization of disparate data sources. Observe that in FIG. 9 the story 912 is geographically scaled based upon the amount of screen space available. That is, in FIG. 9, interface 900 simultaneously displays multiple stories. Consequently, the story control module 200 scales the amount of displayed information in a manner consistent with the amount of screen space available. On the other hand, after story 912 is selected, a data-aware visualization transition occurs, with an enhanced amount of information displayed, as shown in interface 1000 of FIG. 10. Since more space is available in interface 1000, the story control module 200 expands the amount of displayed information. As previously discussed, the data type metadata 166 includes information on data types, data shape and data scale for ingested data. This information may be used to select appropriate visualizations.

The interface 1000 provides different visualization options 1006, 1007, 1008, such as a map, bar graph, scatter plot, table, etc. In this example, the map view 1006 is selected. Each visualization option has a set of default parameters based upon an awareness of the data. In this example, average hotel revenue per hotel for an arbitrary period of time is displayed in one panel 1008, while total hotel revenue for the same arbitrary period of time is displayed in another panel 1010. As shown, shading may be used to reflect density of activity.

The interface 1000 also includes a collaboration section 1012. The filter indicator 1014 specifies that all data is being processed. This filter may be modified for a specific geographic location, say California, in which case the interface of FIG. 11 is provided.

Figure 11:
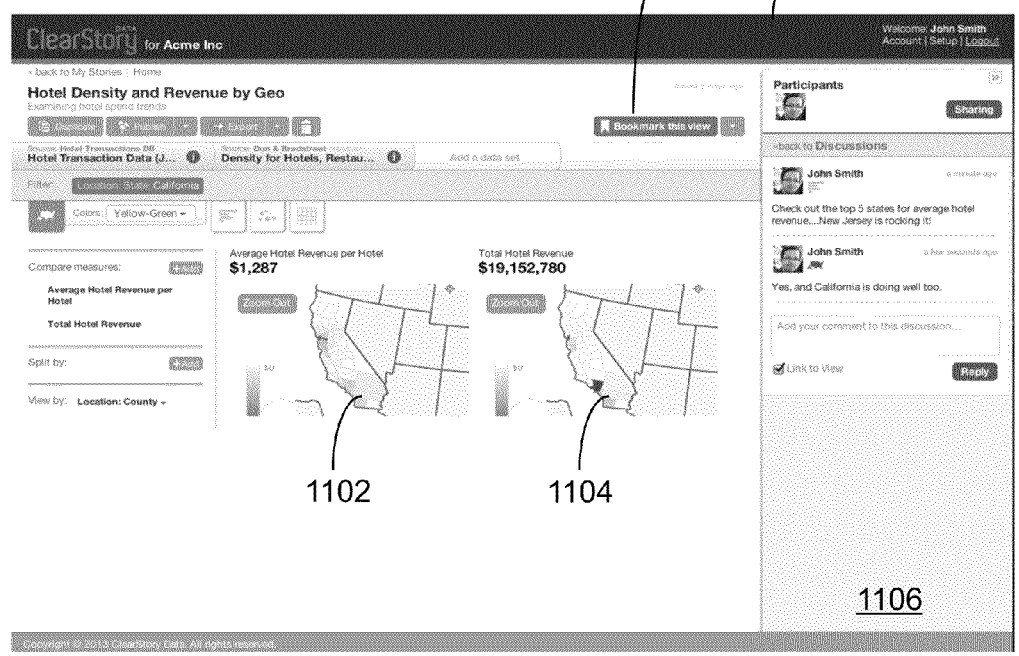
FIG. 11 illustrates context-aware data analysis collaboration.

FIG. 11 illustrates an interface 1100 with the same data as in FIG. 10, but for a smaller geographic region, namely one state, California. A visualization of average hotel revenue per hotel is provided in one panel 1102, while a visualization of total hotel revenue is provided in another panel 1104. Observe that the visualization transition from interface 1000 to interface 1100 is data-aware in the sense that the visualization supplies data relevant to the specified filter parameter.

The collaboration section 1106 illustrates a dialog regarding the data. A tab 1108 allows one to bookmark this view. That is, activating the tab 1108 sets the bookmark field 712 in a data unit 702 associated with the story. This view and associated dialog information is then stored in a data unit 702 and corresponding discussion thread 704. In this way, the information can be retrieved at a later time to evaluate the evolution of a story.

Figure 12:
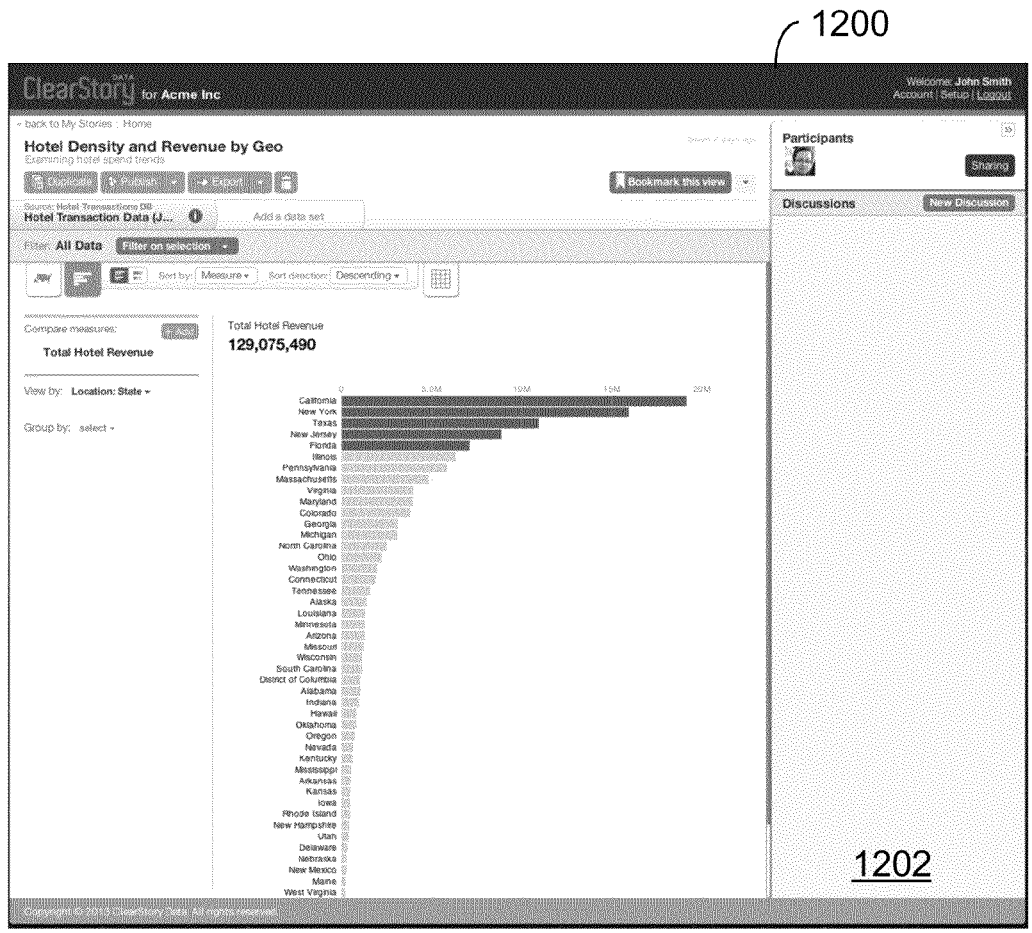
FIG. 12 illustrates data-aware visualization transition utilized in accordance with an embodiment of the invention.

As previously indicated in connection with FIG. 10, different visualization options 1006, 1007 and 1008 are available. If the user selects a bar chart option 1007, then the interface of FIG. 12 is supplied. FIG. 12 illustrates an interface 1200 displaying the total hotel revenue data as a bar chart. Observe here that the filter 1014 is set for all data. Therefore, the transition to the new visualization is for all data. That is, the same data filter is used for the new visualization. Also observe that there is collaboration context awareness as the collaboration section 1012 of FIG. 10 corresponds to the collaboration section 1202 of FIG. 12. A highlight from the visualization of FIG. 10 may carry over to the visualization of FIG. 12. This process is known as highlighting and linking, where a highlight on any one visualization is then linked to every other related visualization. For example, if in FIG. 10, the states California, New York, Texas, New Jersey and Florida are highlighted on the map, those same states are highlighted in the bar graph of FIG. 12.

Figure 13:
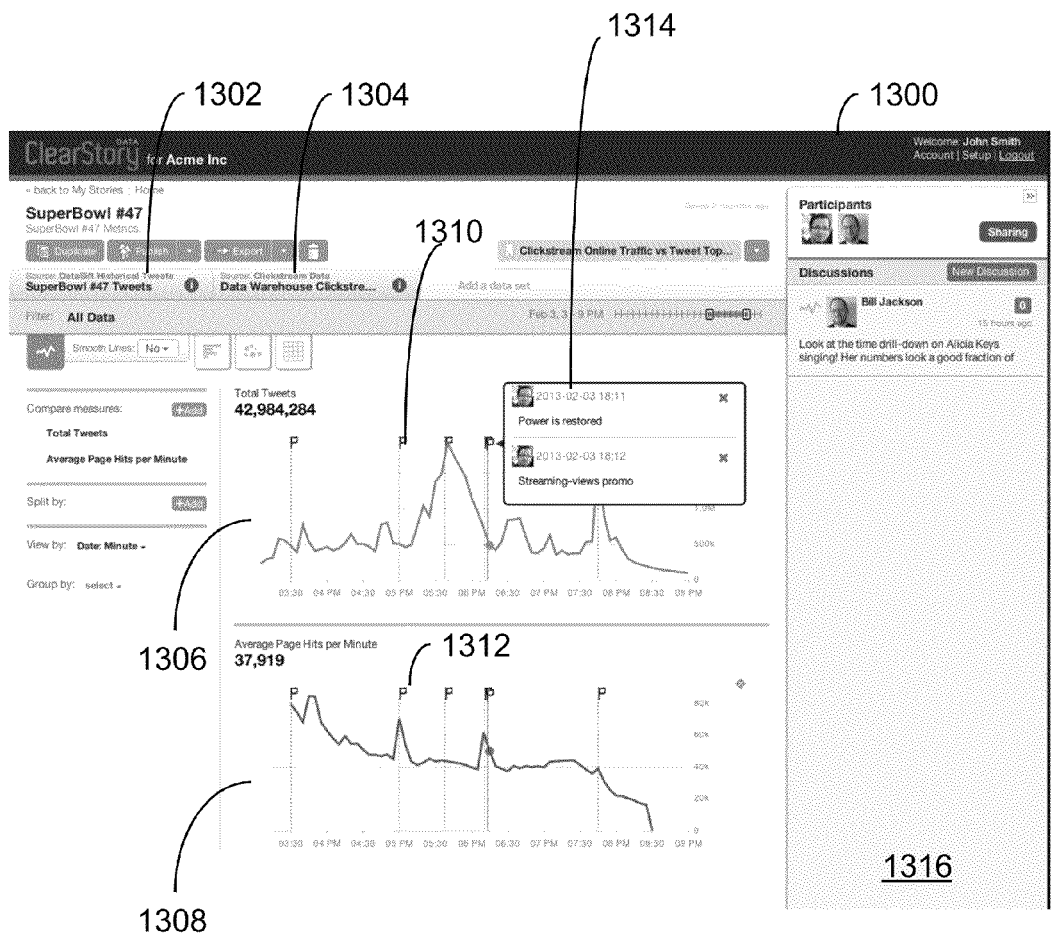
FIG. 13 illustrates data-aware annotations utilized in accordance with an embodiment of the invention.

FIG. 13 illustrates an interface 1300 that displays a first data source 1302 of Tweet frequency data during Super Bowl 47. A second data source 1304 is data from a data warehouse of click stream online activity during the same time period. Graph 1306 is for the data from the first data source 1302, while graph 1308 is for the data from the second data source 1304. The time axes for the two graphs 1306 and 1308 are aligned. Similarly, individual annotations on the two data sets are aligned, as shown by annotations 1310 and 1312. Thus, if an annotation is made on one visualization, it is automatically applied to another visualization.

Hovering over an annotation may result in the display 1314 of collaboration data. A separate collaboration space 1316 with a discussion thread may also be provided. The web application module 160 facilitates the display of annotations 1310 and 1312, collaboration data 1314 and collaboration space 1316 through access to the collaboration metadata 214.

Observe that the annotations 1310 are applied to visualized data. Annotations are stateful annotations in a discussion thread 704 associated with a data unit 702. An annotation may have an associated threshold to trigger an alert. For example, one can specify in an annotation a threshold of $10,000 in sales. When the threshold is met, an alert in the form of a message (e.g., an email, text, collaboration panel update) is sent to the user or a group of collaborators. A marker and an indication of the message may be added to the annotations.

Figure 14:
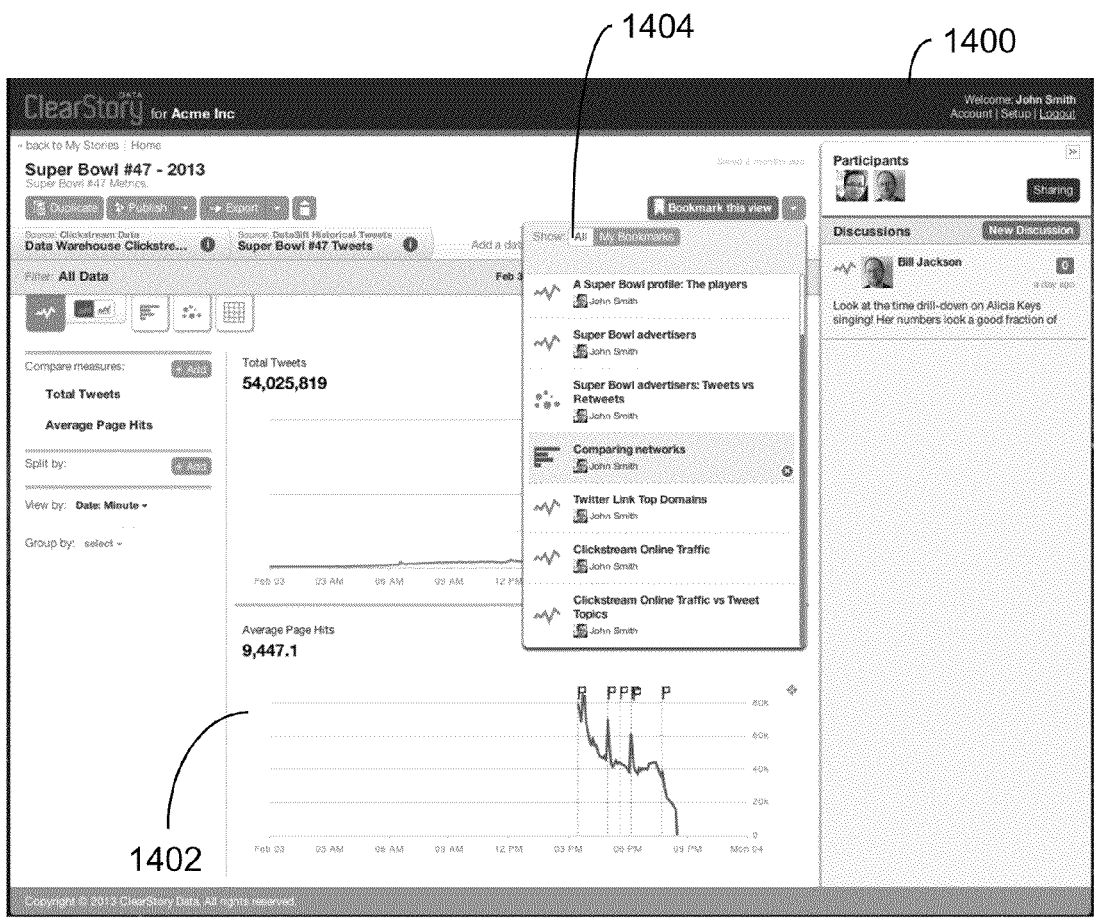
FIG. 14 illustrates context-aware annotations utilized in accordance with an embodiment of the invention.

FIG. 14 illustrates an interface 1400 corresponding to interface 1300, but with a different period of time specified on the time axis. As a result, the five annotations shown in graph 1308 are in a condensed form in graph 1402. The figure also illustrates a set of bookmarks 1404 associated with this view of data. The bookmarks 1404 are supplied by the web application module 160 through its access to the collaboration metadata 214.

Thus, the invention provides convergence between multiple data sources, such as public data sources, premium data sources and private data sources. The invention does not require rigid structuring or pre-modeling of the data. Advantageously, the invention provides harmonization across key dimensions, such as geography, time and categories.

In certain embodiments, data is continuously pushed to a user. Consequently, a user does not have to generate a query for refreshed data. In addition, a user can easily collaborate with others to facilitate analyses across distributed teams. Permission settings enforce user policies on viewing and sharing of data and analyses.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A server, comprising:
a data processing module with executable instructions executed by a processor to:
produce a first inferred data type from first received data and a second inferred data type from second received data;
utilize the first inferred data type to augment the first received data with computed values that aggregate the first received data along a first hierarchical dimension;
utilize the second inferred data type to augment the second received data with computed values that aggregate the second received data along a second hierarchical dimension;
harmonize the first hierarchical dimension and the second hierarchical dimension to a lowest common unit value;
provide a first visualization of the first received data based upon the lowest common unit value; and
provide a second visualization of the second received data based upon the lowest common unit value.

2. The server of claim 1 wherein the first visualization is selected based upon the first inferred data type.

3. The server of claim 1 further comprising instructions executed by a processor to:
supply data join relevance indicia for the received data.

4. The server of claim 3 wherein the data join relevance indicia include numeric indicia.

5. The server of claim 3 wherein the data join relevance indicia include graphical indicia.

6. The server of claim 3 wherein the data join relevance indicia include category indicia.

7. The server of claim 3 wherein the data join relevance indicia include characterizations of components of the received data.

8. The server of claim 7 wherein the characterizations of the received data include a chronological data type component.

9. The server of claim 7 wherein the characterizations of the received data include a geographical data type component.

10. The server of claim 7 wherein the characterizations of the received data include a category data type component.

11. The server of claim 7 wherein each component has separate confidence indicia.

12. The server of claim 3 further comprising instructions executed by the processor to receive user input regarding the join relevance indicia.

13. The server of claim 12 further comprising instructions executed by the processor to utilize the user input to refine data join relevance indicia.

14. The server of claim 1, further comprising:
a data processing module with instructions executed by a processor to:
maintain a collection of data units, wherein each data unit includes data, data version indicia, and data access permissions, wherein the collection of data units includes data from multiple data sources, wherein data from each data source is pre-processed to form a hierarchical dimension of data; and
analyze an individual data unit to spawn an additional data unit added to the collection of data units, wherein the additional data unit includes updated data version indicia.

15. The server of claim 14 wherein the data processing module includes instructions executed by the processor to maintain a collection of discussion threads, wherein each discussion thread is associated with a data unit and each discussion thread uniquely identifies different users and comments made by the different users.

16. The server of claim 15 wherein the data processing module includes instructions executed by the processor to maintain a bookmark field for each data unit, wherein a set bookmark field results in the persistence and maintenance of a view of a data unit and its corresponding discussion thread.

17. The server of claim 14 wherein the data processing module includes instructions executed by the processor to maintain the collection of data units in primary memory.

18. The server of claim 14 wherein the data processing module includes instructions executed by the processor to analyze an individual data unit to spawn an additional data unit with filtered data.

* * * * *